United States Patent Office 2,746,032
Patented May 15, 1956

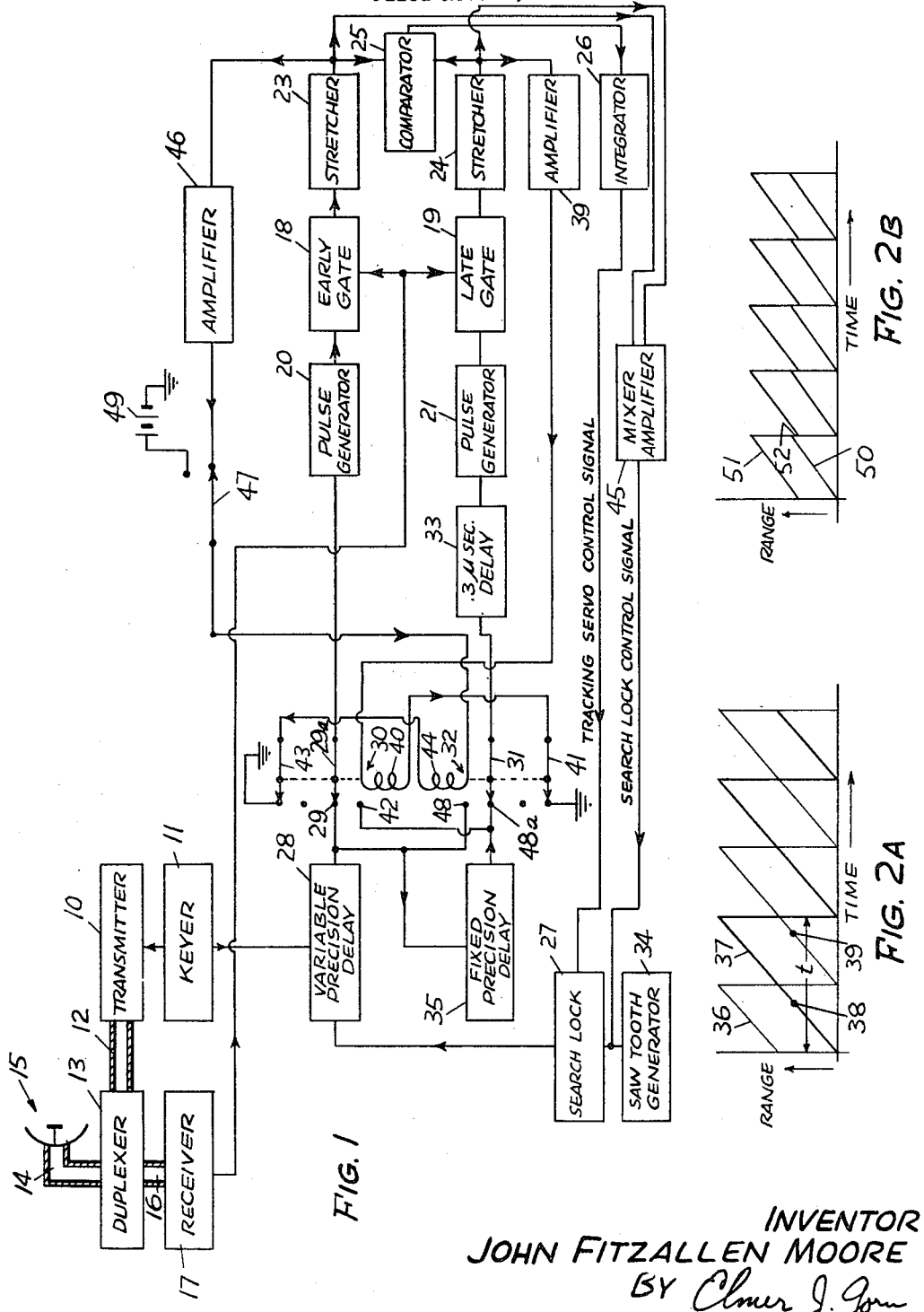

---

2,746,032

TRACKING CONTROL SYSTEM

John Fitzallen Moore, Arlington, Mass., assignor to Raytheon Manufacturing Company, Newton, Mass., a corporation of Delaware Application November 3, 1950, Serial No. 193,837

9 Claims. (Cl. 343—7.3)

This invention relates to systems for automatically searching for objects, and, upon location thereof, automatically locking thereon, and tracking the position thereof. It is well known that systems, for example pulse-echo radar systems, may be made to track the position of objects located by the radar.

Further, there is disclosed in the copending application of Carl A. Segerstrom, Serial No. 188,528, filed October 5, 1950, that the system may be made to automatically search for an object, and, upon location thereof, to automatically shift from search to track, and track the position of said object. In the aforementioned copending application, a pair of gates was used, said gates being displaced from each other in time by a small amount, for example, a fraction of a microsecond. During the search operation, these gates, in effect, operate together since they partially overlap, and, upon the location of an object, a signal appears partly in both gates to initiate the shaft from search to track. Since the time required to search over the desired range of object distances is appreciable, being, for example, in this particular equipment, on the order of a second, and since the equipment is to be used in locating objects traveling at high velocities, for example, in excess of the speed of sound wherein the time duration of a second represents a large difference in position of the missle, it is extremely desirable to locate the object in the shortest possible time.

This invention discloses a system whereby the complete range of distances may be searched in much less than a second. Briefly, this invention embodies the use of a plurality of gates, for example, two, each searching simultaneously in a substantially different part of the range of distances in which an object might appear. It is to be clearly understood that, while this invention discloses only two gates used in the search process, any number may be used, the time of the overall search cycle decreasing substantially as in the inverse ratio of the number of gates employed. When either of the gates encounters a signal, the other gate is shifted to substantially the time position of the gate encountering the signal, being separated therefrom by a fraction of a microsecond in order that the gates may track the object signal.

This invention discloses two methods whereby the simultaneous scanning of different range portions by the two gates may be accomplished. Firstly, the gates may follow each other at substantially equally spaced time intervals with each gate passing throughout a search operation of the entire range. Secondly, the range may be divided up into two substantially equal portions with each gate repeatedly searching only one of the portions and not searching the other.

Other and further objects and advantages of the invention will become apparent as the description thereof progresses, reference being had to the accompanying drawing, wherein:

Fig. 1 illustrates a functional flow diagram of a system embodying this invention;

Fig. 2A illustrates a diagram showing relative gate positions versus time, or the time-sharing method of simultaneous gate search; and Fig. 2B shows a gate position versus time diagram wherein separate range portions of the object distances are searched by different gates.

Referring now to Fig. 1, there is shown a transmitter 10 which may be a standard radar pulse transmitter, transmitter 10 being periodically triggered by pulses from a keyer 11. Pulses from transmitter 10 are fed through a wave guide 12, a duplexer 13, and a wave guide 14 to a directive antenna 15 that radiates the pulses. These energy pulses, upon striking objects, produce reflection signals which are radiated back toward antenna 15. Antenna 15 picks up the reflection signals and feeds them through wave guide 14, duplexer 13, and a wave guide 16 to a receiver 17. Receiver 17 may be, for example, a standard radar pulse receiver, the output of which comprises a video signal corresponding to the envelope of the reflected signal pulses. These pulses are fed into the inputs of early and late gates 18 and 19, respectively, which are opened by signals from pulse generators 20 and 21, respectively, in response to trigger signals applied thereto in a manner to be described presently. The ouputs of early and late gates 18 and 19 are fed through pulse stretchers 23 and 24, respectively, which may be of the type described in the aforementioned copending application, and then to the inputs of a comparator 25 which may be, for example, a differential amplifier.

The output of comparator 25 is fed through an integrating system 26 to a search-lock circuit 27. When the system is locked, the signal from integrating circuit 26 is fed through the search-lock circuit 27 to a variable-precision delay 28. Variable-precision delay 28 is also fed by a pulse from keyer 11 and delays said pulse by a predetermined amount, dependent on the amplitude of the signal fed through the search-lock circuit 27 from the integrator 26. The output of variable-precision delay 28 is fed through a stationary contact 29 and movable contact 29a of a relay 30 to pulse generator 20 to trigger said generator. The output of precision delay 28 is also fed through a stationary contact 48 and a movable contact 31 of a relay 32 when said relay is energized, and through a .3 microsecond delay line 33 to a trigger pulse generator 21.

Due to the .3 microsecond delay, late gate 19 will be opened three tenths of a microsecond after early gate 18. By comparison of the outputs of these gates through comparator 25, the position of the object signal with reference to the time position of the gates 18 and 19 may be ascertained, and this information is then used to control variable-precision delay 28 to correct any error in the time position between gates 18 and 19 and the reflected signal pulse. Thus, if a signal is in gates 18 and 19, and the system is in the track position with the relays 30 and 32 deenergized and energized, respectively, the system will track the reflected signal pulse. The particular details of the circuits 21 through 28 and 33 are described in greater detail in the aforementioned copending application.

In the absence of an object echo, the system will be in a search condition. In this condition, a saw-tooth generator 34 will produce a saw-tooth wave form which is fed through the search-lock circuit 27 to the variable-precision delay 28 to cyclically vary the delay of the pulses from keyer 11 fed through delay 28. The relays 30 and 32 will be both deenergized, and in this position the trigger output from variable delay 28 will be fed directly through stationary contact 29 and movable contact 29a to pulse generator 20, but will not be fed directly through contacts 48 and 31 to the .3 microsecond delay 33. Rather the output of variable delay 28 will be fed through a fixed-precision delay 35 which may be a circuit substantially similar to that of variable delay 28 with a fixed bias being substituted for the signal input from search-lock circuit 27 to variable delay 28. The bias applied to fixed delay 35 may, for example, be sufficient to cause a time delay therein substantially equal to one half the time of a saw-tooth sweep produced by saw-tooth generator 34.

In this condition, the pulse from fixed delay 35 is fed through stationary contact 48a and the movable contact 31 to .3 microsecond delay 33 and will be delayed with respect to the output from delay 28 by approximately one half of a saw-tooth sweep.

In this condition, the system will search in a manner which may be termed time-position sharing, and will be described with reference to Fig. 2A.

In Fig. 2A, time is plotted along the axis of ordinates and range which corresponds to the time delay produced by variable delay 28 is plotted along the axis of abscissa. The period from one saw-tooth wave form is indicated as $t$, and represents the time to produce one complete scanning by one gate of the range of distances. Since the time position of pulse generator 20 is ahead of the time position of pulse generator 21 by a time substantially equal to $$\frac{t}{2}$$

the wave form 36 may be designated to represent the time position of gate 18, while the wave form 37 may be designated to represent the time position of gate 19. Thus, it may be seen that gates 18 and 19, respectively, search simultaneously different parts of the range of distances.

Assume gate 19 passes a reflected signal pulse picked up, for example, at thirty per cent of the maximum range, as indicated by point 38 on wave form 37. A signal passed by gate 19 and made substantially continuous by the action of stretcher 24 will be fed to an amplifier 39 which may be any desired standard power type amplifier. The output of amplifier 39 is fed through the solenoid 40 of relay 30 and, in turn, through a pair of normally-closed contacts 41 of relay 32 to ground, thus completing the circuit.

The signal output from amplifier 39 energizes solenoid 40, thereby causing movable-relay contact 29a to disengage stationary contact 29 and contact a relay contact 42 which is connected to the output of fixed-precision delay 35. In addition, a second set of contacts 43 of relay 30 is opened, said contacts being in series with the solenoid 44 of relay 32 and thus preventing any actuation of solenoid 44.

Under these conditions, both pulse generator 20 and .3 microsecond delay 33 are fed from the output of the fixed-precision delay 35 which, in turn, is fed by the output of the variable-precision delay 28 whose delay depends upon the signal from integrator 26 when the search-lock circuit 27 is in the lock position.

It may be noted that, when a signal appears in amplifier 39, the signal is also fed from stretcher 24 or stretcher 23, as the case may be, through a mixer amplifier 45 to the search-lock circuit 27. This signal disables the saw-tooth generator 34 and causes the search-lock circuit 27 to shift from search to lock. The details of this operation and the circuits utilized are described in greater detail in the aforementioned copending application.

Under these conditions, during the transition from search to lock, the output of fixed-precision delay 35 will be substantially the same as it was when the reflected signal pulse was picked up by gate 19, and, therefore, gate 19 will be maintained at the pick-up position as designated by point 38 on wave form 37.

Actuation of the relay 30 will cause gate 18 to move to substantially the same time position as gate 19, and hence, gate 18 will also pick up the signal. Gates 18 and 19 are displaced from each other by a small time delay, and, will produce a comparison signal which, upon being fed through the search-lock circuit 27, variable-precision delay 28, and fixed-precision delay 35, will move the gates 18 and 19 to position them one on either side of the reflected signal pulse, thus causing the system to track.

If the system were in the search condition, and a signal was picked up by early gate 18, for example, as designated by point 39 on wave form 36 which designates, for example, a range position of approximately thirty per cent of the maximum range, a signal will then be fed from early gate 18 through stretcher 23 to an amplifier 46. The output of amplifier 46 is fed through a closed switch 47 to the solenoid 44 of relay 32, and hence through contacts 43 of relay 30 to ground to complete the circuit.

When the signal output of amplifier 46 energizes relay 32, movable contact 31 disengages stationary contact 48a and engages contact 48 which is connected to the output of variable-precision delay 28. In addition, contacts 41 are opened, thus preventing energization of relay 30.

Under these conditions, the pulse is fed directly from variable-precision delay 28 to pulse generator 20 through contacts 29 and 29a and to the delay 33 through contacts 48 and 31. Since the time position of the trigger pulse with the precision delay 28 is substantially the time position of the received signal, the gates 18 and 19 which are controlled by the time position of this pulse will track on the received signal upon operation of the search-lock circuit 27 to condition the system in the lock position in response to a signal through mixer amplifier 45.

If it is desired to operate the gates 18 and 19 in close proximity to each other during the search condition, the switch 47 is opened, thus disconnecting solenoid 44 from amplifier 46, and connecting said solenoid 44 to a source of potential illustrated herein as a battery 49 which energizes relay 32, thus connecting pulse generator 21 and the .3 microsecond delay 33 to the output of the variable-precision delay 28 at all times.

Referring now to Fig. 2B, there is shown the method of range sharing for use with two or more separate searching gates. For this operation, the fixed delay 35 is maintained at the same delay. However, both the amplitude and duration of the saw-tooth wave form produced by saw-tooth generator 34 are decreased by a factor of approximately one half.

Under these conditions, the time delay output of variable delay 28 will have a wave form 50, as shown in Fig. 2B, which has a range of substantially half the maximum range, and scans this half range at substantially twice the repetition rate of the method previously described in connection with Fig. 2A. Since fixed delay 35 delays the trigger pulse by substantially half the maximum range, the output of fixed delay 35 will have a range versus time wave indicated by wave form 51, wave form 51 being substantially similar to wave form 50, except that it is displaced in range by an amount substantially equal to half the maximum range.

If desired, wave form 51 may be displaced from wave form 50 by a range slightly less than half the maximum range with the result that wave form 51 will slightly overlap wave form 50, as shown, for example, at 52.

The operation of the searching and locking is similar to that previously described in connection with the time-sharing method illustrated in Fig. 2A, and, upon reception of a signal, the tracking operation is similar to that previously described.

It may be noted that in both of these described systems when tracking is occurring by pulses fed through variable delay 28 and fixed delay 35, and a target is being tracked from the outer half of the range into the inner half of the range, a condition will be reached where the signal fed to variable delay 28 will cause variable delay 28 to decrease to zero. At this point, the system will no longer track, but will shift back to search and pick the signal up again in the proper gate under conditions such that either substantially a full time cycle of delay is produced at gate 18 and the pusle fed through delay 35, or approximately one half of a full range voltage will appear on variable delay 28, and fixed delay 35 will be eliminated. For the range-sharing method of Fig. 2B, the latter condition will be the case.

This completes the description of the particular embodiment of the invention illustrated herein. However, many modifications thereof will be apparent to persons skilled in the art without departing from the spirit and scope of the invention. For example, other search and track systems could be used than the one described, and the search system could be used in other than radar systems, for example, underwater sound systems, Loran systems, or other systems wherein a search and track function are desired. Furthermore, the system need not necessarily search according to a saw-tooth pattern, but any desired wave form may be applied to the variable delay to perform the search function. Furthermore, different lock-on systems could be utilized, if desired. Therefore, it is desired that this invention be not limited to the description of the particular species of the invention illustrated herein, except as defined by the appended claims.

What is claimed is:

1. A control system comprising a source of time-position signals, means for producing a signal-time reference, means for sampling signals from said source comprising a plurality of gates spaced a substantial time position apart, and means for moving said gates variable with respect to said signal-time reference and to substantially the same time position upon passage of a signal by said gates.

2. A control system comprising a source of time-position signals, means for producing a signal-time reference, means for sampling signals from said source comprising a plurality of gates variable with respect to said signal-time reference and spaced a substantial time position apart, and control means actuated by passage of a signal by said gates, said control means moving said gates to substantially the same time position.

3. A control system comprising a source of time-position signals, means for sampling signals from said source comprising a plurality of gates spaced a substantial time position apart, and means for moving said gates to substantially the same time position upon passage of a signal by said gates.

4. A control system comprising a source of time-position signals, means for sampling signals from said source comprising a plurality of gates spaced a substantial time position apart, and control means actuated by passage of a signal by said gates, said control means moving said gates to substantially the same time position.

5. A control system comprising a source of time-position signals, a pair of signal-sampling devices fed by said source and having their sampling periods positioned a substantial time position apart, and means for relatively moving said sampling periods of said devices to substantially the same time position upon passage of a signal by said devices.

6. A control system comprising a source of time-position signals, a pair of signal-sampling devices fed by said source and having there sampling periods positioned a substantial time position apart, and means for moving said sampling periods of said devices to substantially the same time position upon passage of a signal by one of said devices.

7. A control system comprising a source of time-position signals, a servo loop having its input connected to said source of signals, said loop comprising a pair of time-position gates fed by said source, means for moving said gates over a range of time positions with said gates being a substantial time position apart, and means for moving said gates to substantially the same time position upon passage of a signal by said gates.

8. A control system comprising a source of time-position signals, a servo loop having its input connected to said source of signals, said loop comprising a pair of time-position gates fed by said source, means for moving said gates over a range of time positions with said gates being a substantial time position apart, and means for moving said gates to substantially the same time position upon passage of a signal by one of said gates, said servo loop being activated substantially simultaneously.

9. A control system comprising a source of time-position signals, a servo loop having its input connected to said source of signals, said loop comprising a pair of time-position gates fed by said source, means for moving said gates over substantially different ranges of time positions, and means for moving said gates to substantially the same time position upon passage of a signal by said gates.

References Cited in the file of this patent

UNITED STATES PATENTS

| | | |
|---|---|---|
| 2,433,667 | Hollingsworth | Dec. 30, 1947 |
| 2,455,265 | Norgaard | Nov. 30, 1948 |
| 2,467,208 | Hahn | Apr. 12, 1949 |
| 2,468,703 | Hammel | Apr. 26, 1949 |
| 2,482,544 | Jacobsen | Sept. 20, 1949 |
| 2,495,753 | Mazley | Jan. 31, 1950 |
| 2,508,565 | Chance | May 23, 1950 |
| 2,516,356 | Tull | July 25, 1950 |
| 2,517,540 | Busignies | Aug. 8, 1950 |
| 2,534,329 | Wilkerson | Dec. 19, 1950 |
| 2,558,358 | Hales | June 26, 1951 |
| 2,581,211 | Sink | Jan. 1, 1952 |
| 2,609,533 | Jacobsen | Sept. 2, 1952 |

FOREIGN PATENTS

| | | |
|---|---|---|
| 588,187 | Great Britain | May 16, 1947 |
| 601,401 | Great Britain | May 5, 1948 |